Inventors
William G. Smith
Joseph L. Neys
by
Attorney

Inventors
William G. Smith
Joseph L. Neys
by
Attorney

Patented Feb. 11, 1947

2,415,569

UNITED STATES PATENT OFFICE 2,415,569

SPOT FACING MACHINE

William G. Smith and Joseph L. Neys, Portland, Oreg.

Application December 13, 1943, Serial No. 514,112

3 Claims. (Cl. 77—1)

The object of our invention is to provide a machine specifically adapted for back facing or spot facing holes through which bolts or other fastening devices are passed. Back facing or spot facing designates the formation of a plane circular shoulder about a hole, so that the head of such bolt, or the nut therefor, will set squarely thereon without producing flexure. At the present time it is common practice to drill or otherwise form such hole; then, to reach through the hole with a boring bar, or similar tool, and back-feed to form such facing. This is particularly true in forming the hold-down holes on the flanges for valves. The reason that back facing must be resorted to is that there is usually an overhanging body, or neck, which prevents the use of a tool extending down over said hole. Back facing or spot facing operations, thus, are slow and expensive.

We have conceived the idea that a machine could be built with an extremely narrow head which could reach in between said flange and said overhanging member, so that a facing operation could be performed directly upon the face of said flange surrounding a hole.

The details of one embodiment of our invention are hereinafter described with reference to the accompanying drawings, in which.

Figure 1:
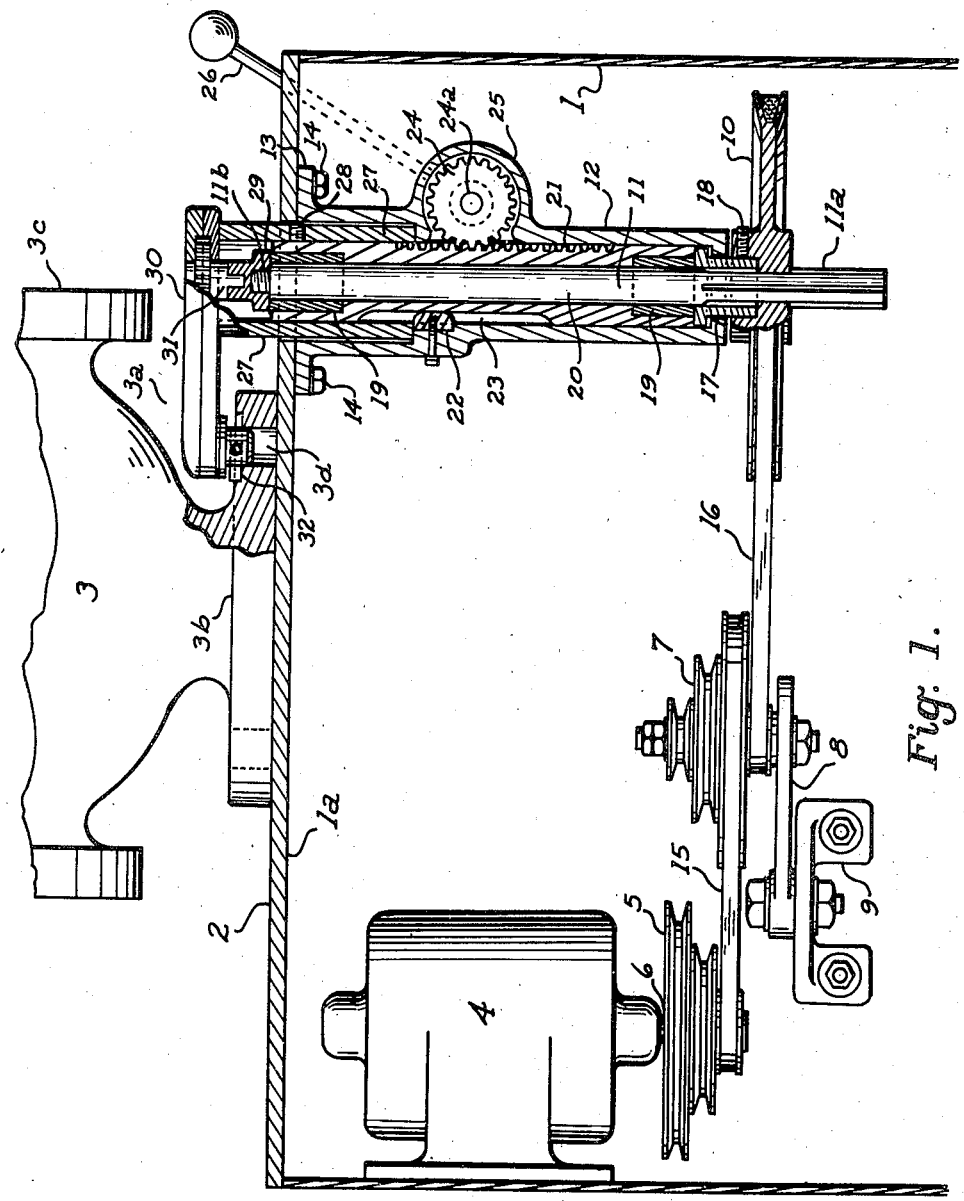
Fig. 1 is a vertical section through the base of a machine embodying our invention with some portions shown broken away to disclose details of construction and operation.

A machine embodying our invention includes a hollow base 1, the top 1a having an upper surface 2, which constitutes a work-supporting member. That is, a valve 3 or other structure being machined may be supported by said surface.

So as to make said machine wholly self-contained, we make said base hollow to enclose a motor 4 and power transmitting mechanism, such, for example, as a cone pulley 5 secured to the shaft 6 of said motor. A companion pulley 7 is pivotally supported upon an arm 8, carried by a bracket 9 secured to said base. A driving pulley 10 is secured to the splined end 11a of spindle 11. It is preferred that said spindle be supported vertically in a housing 12 by a flange 13 fastened to the underside of member 1a by studs 14, or other fastening devices.

Power is transmitted from cone pulley 5 to companion pulley 7 by an endless V-belt 15. Power is transmitted from companion pulley 7 to driving pulley 10 by an endless V-belt 16. The driving pulley is prevented from rotating on the spindle, because the bore of said pulley is made complementary to the periphery of the splined end. A sleeve bearing 17 is carried by said spindle, and the driving pulley 10 is held against movement longitudinally of the housing 12 by engagement of a set screw 18 with said sleeve bearing 17, as is shown most clearly in Fig. 1.

Said spindle is rotatably carried by a pair of spaced journal bearings 19. Said bearings are carried by a cylindrical member 20, on one face of which an elongated rack 21 is cut. Said rack is prevented from turning in the housing 12 by a key 22, carried by said housing and slidably engaging a keyway 23 formed in said cylindrical member. Thus, the spindle and said cylindrical member may be moved longitudinally of the housing 12 without affecting the drive of the pulley 10 with the spindle. A pinion 24 is rotatably supported in a boss 25, forming a part of said housing and operatively engaging the rack 21. Thus, rotation of said rack clockwise causes the cylindrical member 20 and the spindle to be lifted, and a counter-clockwise rotation causes said members to be lowered. An operating lever 26 is secured to the pinion through its shaft 24a, so as to effect said lifting and lowering action. A detachable sleeve 27 is secured at the top of the cylindrical member 20 by means of a set screw 28, so that said sleeve moves with member 20 and spindle 11. The upper end 11b of said spindle is threaded, and a slotted coupling 29 is removably secured thereto.

The portions of the machine described up to this point are more or less optional and are intended by us to be but one embodiment of many optional structures. We preferably join to the sleeve 27, a powerhead 30, which has a coupling 31 arranged therein adapted for operative engagement with, being complementary to, coupling 29. The powerhead preferably includes sleeve 27, which is welded or otherwise formed integral with said head. Said head is relatively thin and has a cutting tool 32 depending upon the extremity thereof, so that it may be inserted into restricted areas, such, for example, as the space 3a lying above the flange 3b of valve 3, and underlying the T portion 3c thereof.

It is essential, in our opinion, that this powerhead be made as thin as possible so that it can be inserted in the smallest space. To this end, we make said head with a flat lower half 33. Adapted to be secured thereto is a similar flat upper half 34, and said halves are secured together by screws 35. Both of said halves 33 and 34 are counter-bored exactly to receive a plurality of meshing gears 36a, 36b, 36c and 36d. The gear 36a is formed integral with coupling 31, which coupling extends through and below the powerhead. That is, said coupling depends into the bore of sleeve 27. The gears 36b and 36c are similar and intermesh, and gear 36b meshes with gear 36a. Arranged closely within the rounded end 37 of the powerhead is gear 36d, meshing with gear 36c.

Figure 2:
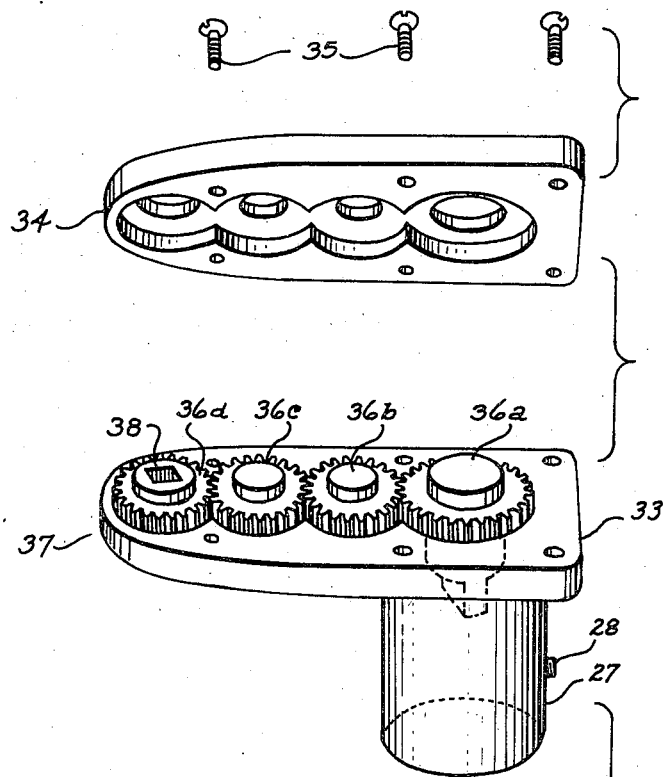
Fig. 2 is a perspective view of the head of such machine with the parts shown spaced apart to disclose details of construction; and, Fig. 3 is an enlarged elevation of such head with parts shown broken away.
Figure 3:
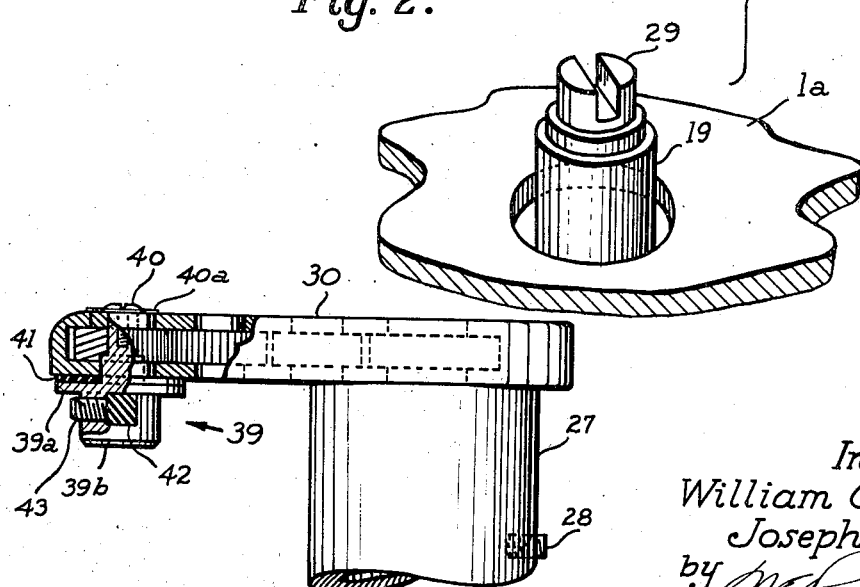

The bore 38 of said gear 36d is non-circular, being shown square in Fig. 2, and the squared end of cutter head 39 fits tightly in said bore. Said cutter head is held therein by a screw 40 and a washer 40a, as is shown in Fig. 3. The underside has a shoulder 39a of greater diameter formed thereon, and a wearing washer 41 is preferably arranged between shoulder 39a and underface of member 34. A cutter bit 42 is adapted to extend diametrically through a boss 39b of said cutter. Said cutter bit is held in place by a set screw 43. A cutter 39 is selected with a boss 39b to fit exactly the diameter of a hole 3d to be spot faced or back faced. Said boss thus serves as a guide to prevent gyration of the cutter head with said hole. A cutter bit of selected length is affixed thereto, so that a swath of proper size will be cut away, in performing said back facing or spot facing operation. There is usually a relative arrangement of diameter of spot face to diameter of hole, because the spot face is preferably formed to accommodate the head of a bolt which is, more or less, standard for a given shank. It is desirable, however, that said cutter bit be adjustable to vary the diameter of spot face to be formed, and also to be removable so that the bit may be easily sharpened or replaced. The arrangement of cutter to powerhead is such that any of a series of cutters may be provided, so that a cutter having a boss of selected diameter may be used to fit a given hole. Also, the powerhead may be removed and replaced by one of predetermined length or gear ratio merely by rotating the pinion clockwise until the set screw 28 comes above the surface 2. By backing off the set screw, said powerhead may be lifted from the place and replaced by another.

By providing a machine of this character with a powerhead which is relatively flat and elongated, and with a cutter arranged at the very extremity, we are able to work directly upon the surface to be back faced or spot faced. Also, because the boss fits snugly within the hole, it is not usually necessary to clamp a valve or other member to the top of the base 1. It is common to have many holes spaced circumferentially of a flange, and, thus, the facing operation must be repeated a corresponding number of times in spot facing the entire flange. This may be performed very rapidly by the use of our machine, because the valve may be inserted under the head and only roughly alined. The boss will tend to provide exact alinement, and the head may then be lowered quickly into place to perform the spot facing operation. Attention is called to the fact that the boss is "sniped off"—that is, tapered at its extremity to aid in promoting alinement. Thus, the several holes may be operated upon successively merely by manually turning the valve and lining the hole with the cutter. Compared with the normal procedure of counter-boring or back facing, this operation may be performed many times as fast and with assured results. That is, the faces of said flanges are machined. The plane of said outer faces of the flanges, thus, lie flat upon the surface 2, and the powerhead is in parallelism therewith. Thus, the plane of the spot facing is maintained in exact alinement with the plane of said outer face of the flange for the purpose desired.

We claim:

1. A spot facing machine comprising a base the upper face of which defines a plane work supporting surface, power means housed within said base, a longitudinally adjustable, vertically extending spindle operatively joined with one end of said power means, the other end extending above said work supporting surface, a powerhead secured to the latter end of said spindle and adapted to sweep over a portion of said work supporting surface, said power head including a flat elongated casing, a cutter element mounted at the free end thereof and power transmitting mechanism housed within said casing whereby a piece to be operated upon may be seated upon said surface, to be spot-faced by said cutter.

2. A spot facing machine comprising a base the upper face of which defines a plane work supporting surface, power means housed within said base, a longitudinally adjustable, vertically extending spindle operatively joined with one end of said power means, the other end extending above said work supporting surface, a powerhead secured to the latter end of said spindle and adapted to sweep over a portion of said work supporting surface, said powerhead including a flat elongated casing, a cutter element mounted at the free end thereof and power transmitting mechanism housed within said casing, said cutter element having a pilot boss formed therein, proportioned exactly to fit the hole to be spot-faced, and a cutter bit extending transversely thereof whereby a piece to be spot-faced by said cutter may be seated upon, without being clamped to said surface.

3. A spot facing machine comprising a base the upper face of which defines a plane work supporting surface, power means housed within said base, a longitudinally adjustable, vertically extending spindle operatively joined with one end of said power means, the other end extending above said work supporting surface, a powerhead secured to the latter end of said spindle and adapted to sweep over a portion of said work supporting surface, said powerhead including a flat elongated casing, a cutter element mounted at the free end thereof and power transmitting mechanism housed within said casing, said cutter element having a pilot boss formed therein, proportioned exactly to fit the hole to be spot-faced, and a cutter element being proportioned and arranged to cut a swath sweeping outwardly beyond the vertical plane of the free end of said casing, whereby a piece to be spot-faced by said cutter may be seated upon, without being clamped to said surface.

WILLIAM G. SMITH.
JOSEPH L. NEYS.

REFERENCES CITED

The following references are of record in the file of this patent:

UNITED STATES PATENTS

| Number | Name | Date |
| --- | --- | --- |
| 374,181 | Evans | Dec. 6, 1887 |
| 1,112,730 | Trivers et al. | Oct. 6, 1914 |
| 1,540,699 | McMullen | June 2, 1925 |
| 676,669 | Wack | June 18, 1901 |
| 1,318,059 | Wood et al. | Oct. 7, 1919 |